US012678902B2

(12) United States Patent
Piasentin

(10) Patent No.: US 12,678,902 B2
(45) Date of Patent: Jul. 14, 2026

(54) NUMERICAL CONTROL TOOL MACHINE

(71) Applicant: PROQUADRO S.R.L., Pordenone (IT)

(72) Inventor: Mirko Piasentin, Pordenone (IT)

(73) Assignee: TECNO LOGICA S.R.L., Spresiano (IT)

( * ) Notice: Subject to any disclaimer, the term of this patent is extended or adjusted under 35 U.S.C. 154(b) by 880 days.

(21) Appl. No.: 17/601,975

(22) PCT Filed: Apr. 7, 2020

(86) PCT No.: PCT/IB2020/053318
§ 371 (c)(1),
(2) Date: Oct. 7, 2021

(87) PCT Pub. No.: WO2020/208526
PCT Pub. Date: Oct. 15, 2020

(65) Prior Publication Data
US 2022/0203494 A1 Jun. 30, 2022

(30) Foreign Application Priority Data
Apr. 8, 2019 (IT) ........................ 102019000005394

(51) Int. Cl.
*B23Q 3/155* (2006.01)
*B23Q 39/04* (2006.01)

(52) U.S. Cl.
CPC ........ *B23Q 3/15503* (2016.11); *B23Q 39/044* (2013.01); *B23Q 39/046* (2013.01); *Y10T 483/10* (2015.01); *Y10T 483/165* (2015.01)

(58) Field of Classification Search
CPC ...... B23Q 7/045; B23Q 7/046; B23Q 39/044; B23Q 39/046; B23Q 39/048; B23Q 41/02;
(Continued)

(56) References Cited

U.S. PATENT DOCUMENTS 4,955,463 A * 9/1990 Honma .................... B25B 5/062
198/465.1
5,090,100 A * 2/1992 Klett .................... B23Q 16/025
74/820
(Continued)

FOREIGN PATENT DOCUMENTS

DE 202018100761 U1 2/2018
EP 0462533 A2 * 12/1991 ........... B23Q 7/1494
(Continued)

*Primary Examiner* — Sunil K Singh
*Assistant Examiner* — Michael Vitale
(74) *Attorney, Agent, or Firm* — Rivka Friedman

(57) ABSTRACT
An operation method is described for a numerical control tooling machine comprising a piece-carrying table rotatable about a—in use—vertical axis and N machining stations, N≥2, arranged around the table, with the steps of
rotating the table to bring a piece in front of a station,
disconnecting the piece from the table,
transferring the piece from the table to the station,
fixing the piece to the station,
processing the piece at the station,
disconnecting the piece from the station,
transferring the piece from the station to the table,
fixing the piece to the table,
rotating the table to bring the piece in front of a different station or unloading the piece from the table.

11 Claims, 8 Drawing Sheets

(58) Field of Classification Search
CPC .............. Y10T 29/5127; Y10T 483/16; Y10T
483/165; Y10T 29/5124; Y10T 29/5128;
Y10T 29/5196; Y10T 483/10
USPC ....... 483/14, 15, 1; 29/38 R, 38 A, 33 P, 563
See application file for complete search history.

(56)                    References Cited

U.S. PATENT DOCUMENTS

| | | | | |
|---|---|---|---|---|
| 5,781,983 | A * | 7/1998 | Gruner ................. | B23Q 7/1494 |
| | | | | 409/164 |
| 5,815,902 | A * | 10/1998 | Osterried ............ | B23Q 39/048 |
| | | | | 29/563 |
| 7,404,786 | B2 * | 7/2008 | Krosta ............... | B23Q 3/15773 |
| | | | | 483/1 |
| 8,056,200 | B2 * | 11/2011 | Hesse ................... | B23P 21/006 |
| | | | | 483/14 |
| 8,114,001 | B2 * | 2/2012 | Horn ................... | B23Q 11/005 |
| | | | | 409/137 |
| 8,430,226 | B2 * | 4/2013 | Tokunaga ................ | B23Q 7/02 |
| | | | | 198/470.1 |
| 9,027,215 | B2 * | 5/2015 | Sueoka ................ | B23Q 39/044 |
| | | | | 29/430 |
| 9,522,433 | B2 * | 12/2016 | Kato ...................... | B23Q 3/157 |
| 2011/0024264 | A1 * | 2/2011 | Tokunaga ............... | B23Q 7/02 |
| | | | | 198/478.1 |
| 2015/0328735 | A1 | 11/2015 | Lutz | |
| 2017/0274553 | A1 * | 9/2017 | Martinez ................. | B27M 3/18 |
| 2021/0220952 | A1 * | 7/2021 | Spada ................... | B23Q 1/527 |

FOREIGN PATENT DOCUMENTS

| | | | | | |
|---|---|---|---|---|---|
| EP | 1454711 | A1 | 9/2004 | | |
| FR | 2115764 | A5 * | 7/1972 | ........ | B23Q 3/15539 |
| GB | 881123 | A | 11/1961 | | |
| JP | 58126033 | A * | 7/1983 | | |
| JP | 01135450 | A * | 5/1989 | | |

* cited by examiner

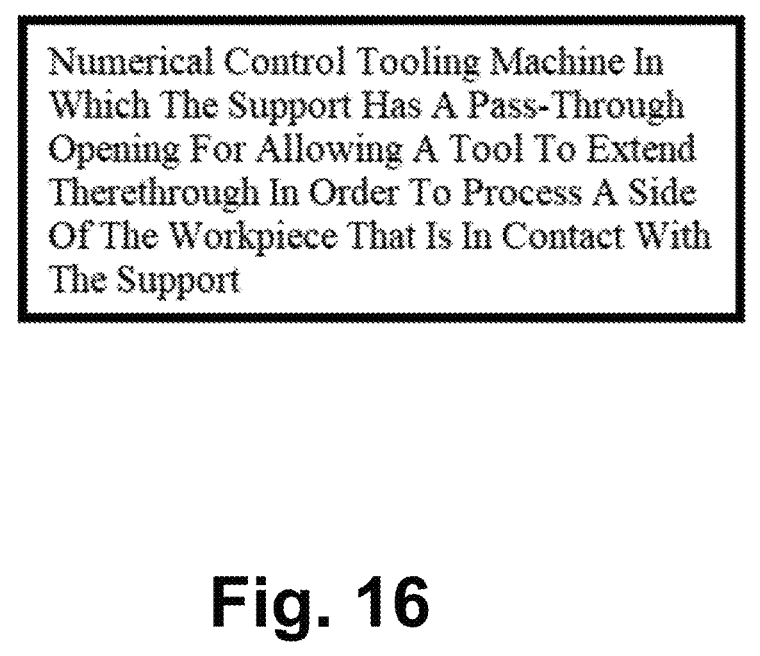

Numerical Control Tooling Machine In
Which The Support Has A Pass-Through
Opening For Allowing A Tool To Extend
Therethrough In Order To Process A Side
Of The Workpiece That Is In Contact With
The Support

Fig. 16

NUMERICAL CONTROL TOOL MACHINE

The present invention relates to a numerical control tool machine.

In numerical control tool machines a felt problem is the reduction of vibrations to improve machining precision. For example, in tool machines comprising a table rotatable about a vertical axis and N machining stations, N≥2, arranged around the table, if a station imposes a high-power machining operation it is very probable that the generated vibrations propagate to the other stations. Compensating for these disturbances is not always possible, and in any case it is necessary to complicate the system to do it.

The main object of the invention is to improve the present state of the art.

Another object of the invention is to create an improved tool machine able to mitigate the aforementioned problem of unwanted vibrations.

These and other objects are achieved by what is stated in the attached claims; advantageous technical characteristics are defined in the dependent claims.

A method of operation is proposed for a numerical control tool machine comprising a piece-carrying table rotatable about a—in use—vertical axis and N machining stations (e.g. by tool), N≥2, arranged around the table, with the steps of rotating the table to bring a piece to be machined in front of a station,
disconnecting the piece from the table,
transferring the piece from the table to the station,
fixing the piece to the station,
machining the piece in the station,
disconnecting the piece from the station,
transferring the piece from the station to the table,
fixing the piece to the table,
rotating the table to bring the piece in front of a different station or unloading the piece from the table.

Through the above steps the piece (or the support for the piece, see below) is alternatively made integral either only to the table or only to one station, with the big advantage that the vibrations generated by the machining in correspondence of a station remain much more confined inside the station itself. This holds for each piece that is delivered to a station of the sequence of stations, so that for each station and each workpiece the advantage indicated above is simultaneously valid.

According to a preferred embodiment, the piece is mounted on the table applying it to a support that is translated radially to and from a station.

According to a preferred embodiment, the piece or the support for the workpiece is rotated about a—in use—vertical axis when the workpiece or the support is transferred and connected to a station.

According to a preferred embodiment, the piece is worked by rotating the support about said in use vertical axis and inserting a tool in a pass-through opening of the support to reach one side of the piece in contact with the support.

According to a preferred embodiment, after the piece or support is transferred and connected to a station, a recalibration is performed of the machining coordinates to compensate for positional errors. E.g. the recalibration takes place by probing the piece after it has been transferred and connected to a station.

According to a preferred embodiment, the piece or support is moved from the table to a station by anchoring the piece or support to a frame or chassis of the station. In particular, the frame or chassis is a vertical beam placed in front of the table.

According to a preferred embodiment of the method,
a tool (or set of tools) is loaded onto the table or on said support
by turning the table or said support the tool (or set of tools) is brought to one of the N machining stations,
and in such station the tool is picked up and mounted on a spindle or robotic arm to perform a machining on the piece.

In this way one can take advantage of the rotation of the table or of the support for transporting not only the piece but also the tools necessary for its machining.

Another aspect of the invention relates to a numeric control tool machine tool comprising:
a piece-carrying table that is rotatable about a—in use—vertical axis;
N machining stations (e.g. by tool), with N≥2, arranged around the table to be fed from the table and machine a piece, e.g. by a tool,
first means for transferring the piece from the table to a station and from such station to the table,
second means for fixing the piece to the table or to the arrival station after respectively a transfer of the piece from the station or from the table performed by the first means.

According to a preferred embodiment, the machine comprises a support for the piece configured to be transferred together with the piece to—and re-taken from—a station, and the first means are configured to transfer the support from the table to a station and from that station to the table, and the second means are configured for fixing the support to the table or to the arrival station after respectively a transfer of the support from the station or from the table executed by the first means.

According to a preferred embodiment, the machine comprises between the table and a or each station a radial linear guide coupled to said support, the guide being configured to translate radially back and forth the support from the table to a station.

Preferably the support extends mainly along a plane which is vertical in use.

Preferably a or each station comprises means for rotating the support about a—in use—vertical axis, parallel to that of rotation of the table, when the support is connected to the station. This degree of freedom for the support or the piece not only facilitates the machining of the tool in one of the N stations (also reducing the number of stations), but also the chip disposal, which fall off the workpiece by gravity.

Preferably the support comprises pass-through openings passing from one of its sides to the other, so that a tool can work the piece by passing through the support's thickness.

Note the significant advantage of being able to rotate the support by 180 degrees at each station. The piece can thus show both the upper side and the lower side placed on the support, without the piece having to be re-clamped. The processing of the rear side positioned on the support occurs through the aforementioned windows or pass-through openings arranged in the support itself, through which openings the operating unit can find access to the piece. These two aspects contribute synergistically to the efficiency of the machine.

According to a preferred embodiment, the second means comprise means or a device (or a device or clamping means)

for connecting the support selectively to the table or the station, or releasing it, in dependence of the status of a control input.

By clamping or clamping means an assembly of elements is meant which perform the function of keeping the support and the table united together, or making them detachable, conditionally on the state of a control input.

The control input may be e.g. an electrical signal to command the means for anchoring, the position of a manual control member, or a fluid flow such as air or oil.

E.g. the means for connecting comprise electromagnets, suction cups, or three parts connectable to each other on command: a first part fixed on the support, a second part fixed on the table and a third part, equal to the second, fixed on the station.

According to a preferred embodiment, one of said parts comprises a cone or truncated cone, and the other part comprises a complementary shaped cavity to receive the cone or truncated cone. This system guarantees mechanically precise and repeatable centering of the support on the table.

Furthermore, the mechanical precision allows limiting the operations of probing or measurements on the piece.

According to a preferred embodiment, the first and second parts are configured as male-female parts that can fit together.

According to a preferred embodiment, the means for connecting comprise a locking element movable between two positions for respectively constraining or not the first and second or third part to each other, the position of the movable locking element being controllable by said control input.

According to a preferred embodiment, the machine comprises probing means for detecting the actual position of the support on the table and on the station, to compensate for positional errors thereof by changing the machining program performed by tools in the N stations.

According to a preferred embodiment, a or each station comprises a frame or chassis to which the support can be anchored by means of the second means.

In particular, the frame or chassis is a beam structure placed vertically in front of the table, in particular composed of two vertical uprights joined by two horizontal crosspieces.

In particular, the third part of the means for connecting is mounted on the frame or chassis, the second part of the means for connecting is mounted on the table and the first part of the means for connecting is mounted on the support for the piece. In the variant with rotating support pivoted on the station, the third part of the means for connecting is mounted on an abutment element mounted rotatably on the frame or chassis.

According to a preferred embodiment, each station is placed substantially at the top of an imaginary regular polygon and the table is placed in the center of the polygon.

According to a preferred embodiment of the machine, the machine comprises
third means for fixing a tool integrally to the table, and
fourth means for transferring the tool from the table to one of the N machining stations.

In particular, the third means comprise or are constituted as said second means, in a or each of the variants described above.

In particular, the fourth means comprise or are constituted as said first means, in a or each of the variants described above.

More particularly, the fourth means comprise an arm or member linearly movable in a radial direction with respect to the table, on the arm being mounted said third means for fixing.

By moving the member or arm it is then possible to bring the tool to a processing station and/or pick up the tool from a machining station.

Preferably a set of tools is simultaneously moved by the third means and the fourth means.

A variant of the method for a numerical control tool machine comprising a piece-carrying table rotatable about a—in use—vertical axis and N machining stations, N≥2, arranged around the table, comprises the steps of
rotating the table to bring a piece to be worked in front of a station,
disconnecting the piece from the table,
transferring the piece from the table to the station,
fixing the piece to the station and machining the piece at the station by performing steps A to D;
disconnecting the piece from the station,
transferring the piece from the station to the table,
fixing the piece to the table,
rotating the table to bring the piece in front of a different station or unloading the piece from the table,
wherein the method is to machine a piece that is clamped in a clamping element and is machined by a tool movably mounted on the machine, wherein the steps A to D are:
A. the clamping element is rigidly connected to a frame of the numerical control machine,
B. an optical scan of a geometry present in a portion of the piece is performed,
C. from digital data obtained during the optical scan a coordinate of the geometry is determined in a frame of reference integral with the machine frame,
D. digital data, in particular coordinates, relating to a predetermined machining sequence are processed to generate machining coordinates in the reference frame integral with the machine frame for an actuation of the tool, said machining coordinates being such that the tool applies the predetermined machining sequence to the piece in correspondence of said coordinate.

In step B the optical scanning takes place e.g. through a digital camera or a laser beam.

Preferably in step C the digital data is processed for
recognizing a geometric pattern, e.g. corresponding to a rough machining, and from the geometric pattern said coordinate is obtained; and/or
recognizing image parts and assigning said coordinate to said parts.

Preferably in step B the optical scanning is performed on an edge of the piece, more preferably on two opposite edges of the piece, in particular for determining the position of cavities to be finished with the tool.

Further advantages will become clear from the following description, which refers to an example of a preferred embodiment of a machine wherein:

FIG. 16 is a numerical control tooling machine in which the support has a pass-through opening for allowing a tool to extend therethrough in order to process a side of the workpiece that is in contact with the support.

Equal numbers in the figures indicate equal or substantially equal parts. In order not to crowd the drawings, sometimes same elements are not numbered.

Figures 1, 2:
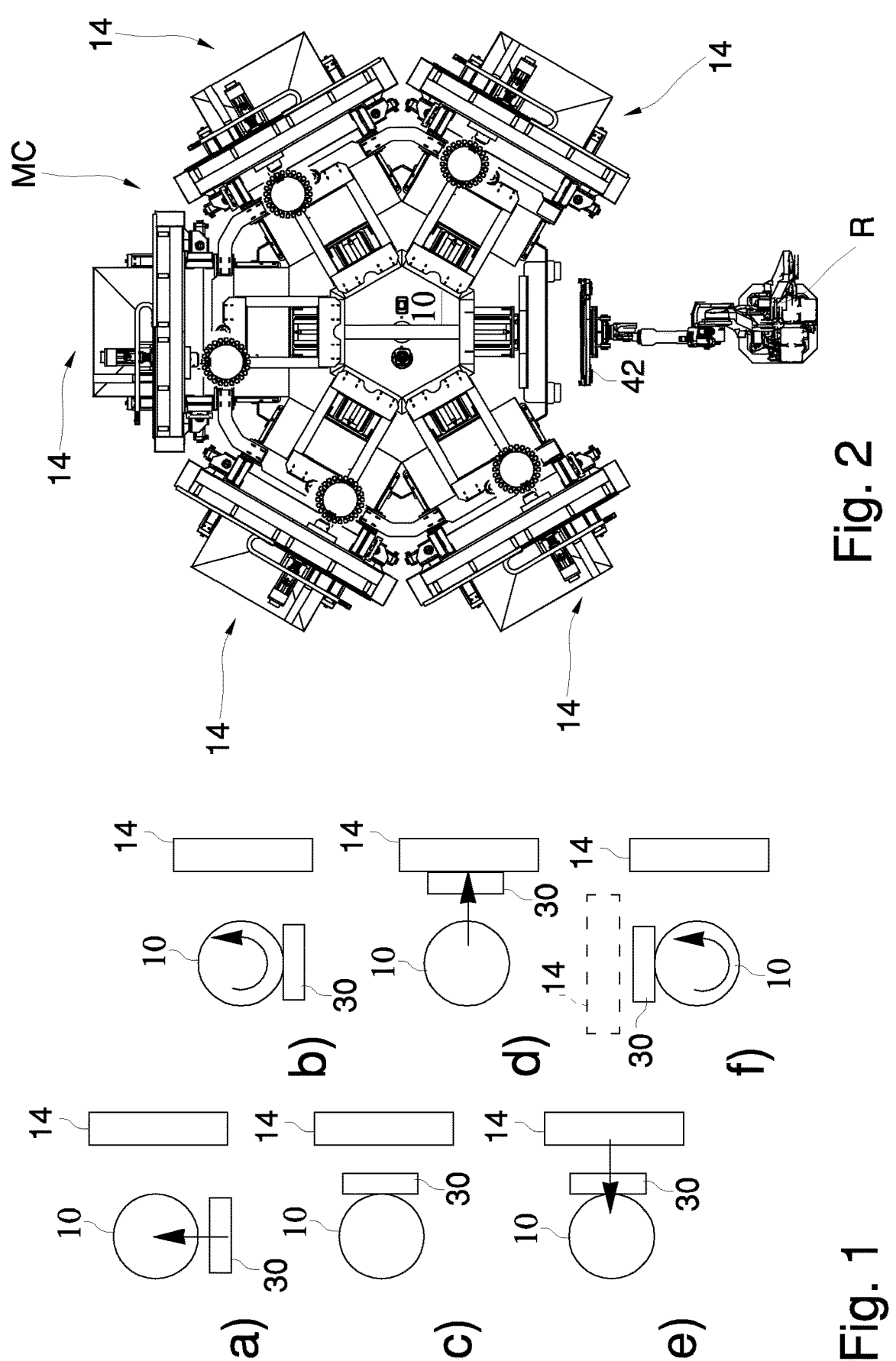
FIG. 1 shows a schematic machining sequence of the machine.
FIG. 2 shows a top view of the machine.

FIG. 2 shows the plan of a numerical control tool machine MC comprising a central table 10 rotatable about a—in use—vertical axis Y1, and a plurality of machining stations 14, in the example five, equipped with a with tool and arranged around the table 10. By rotating the table 10 about the axis Y1 a piece can be moved sequentially from a loading position with robot R across the stations 14 to be machined there.

The table 10 is composed of a central drum 20 from which symmetrically—in the example six—radial guides 22 radially extend towards each station 14, slidingly supporting a flat support 30 for a piece 42.

By means of the radial guides 22 the support 30 can be radially moved away from or near to the axis Y1, while by rotating the table 10 the support 30 can be rotated in front of one of the stations 14.

In particular, the table 10 can simultaneously accommodate in the example six supports 30, to maximize production efficiency.

A piece 42 can be mounted individually on the support 30, or preferably on a or each support 30 there is loaded the assembly of a clamping-unit comprising locking members, e.g. pneumatic clamps or magnets or suction cups, to hold the piece 42 on the support. Hereinafter with "piece" we will generally indicate one case or the other.

A or each support 30 can be connected integrally to the table 10 or to a station 14, e.g. via a quick-release connection. For this purpose a or each support 30 comprises anchoring/connecting means to the table 10 and to the station 14 which can be activated/deactivated in dependence of the status of a control input.

The anchoring means in the illustrated variant comprise two facing parts couplable on command: a fixed part on the support 30 and a fixed part on the table and on the station 14.

The fixed part on the table 10 and on the station 14 comprises (FIGS. 8 and 9) a protruding pin 50 equipped with a conical portion 54 and radial pins 52 able to protrude more or less from the lateral surface of the pin 50.

The fixed part on the support 30 comprises (FIG. 10) a disk 60 with a cavity 62 complementary to the pin 50 and to the conical portion 54. The complementarity between the conical shapes ensures good centering. In the cavity 62 there are holes complementary to the pins 52. The pin 50 and the cavity 62 are configured as male-female parts that can fit together.

To attach the support 30 to the table 10 or to the station 14 the support 30 is horizontally moved closer to the table 10 or the station 14 so that the pin 50 fits into the cavity 62 and the pins 52 are controlled, for example through an input of compressed air or oil, to come out of the pin 50 and enter the corresponding holes in the cavity 62, so as to solidly connect the support 30 to the table 10 or the station 14.

Figures 7, 8:
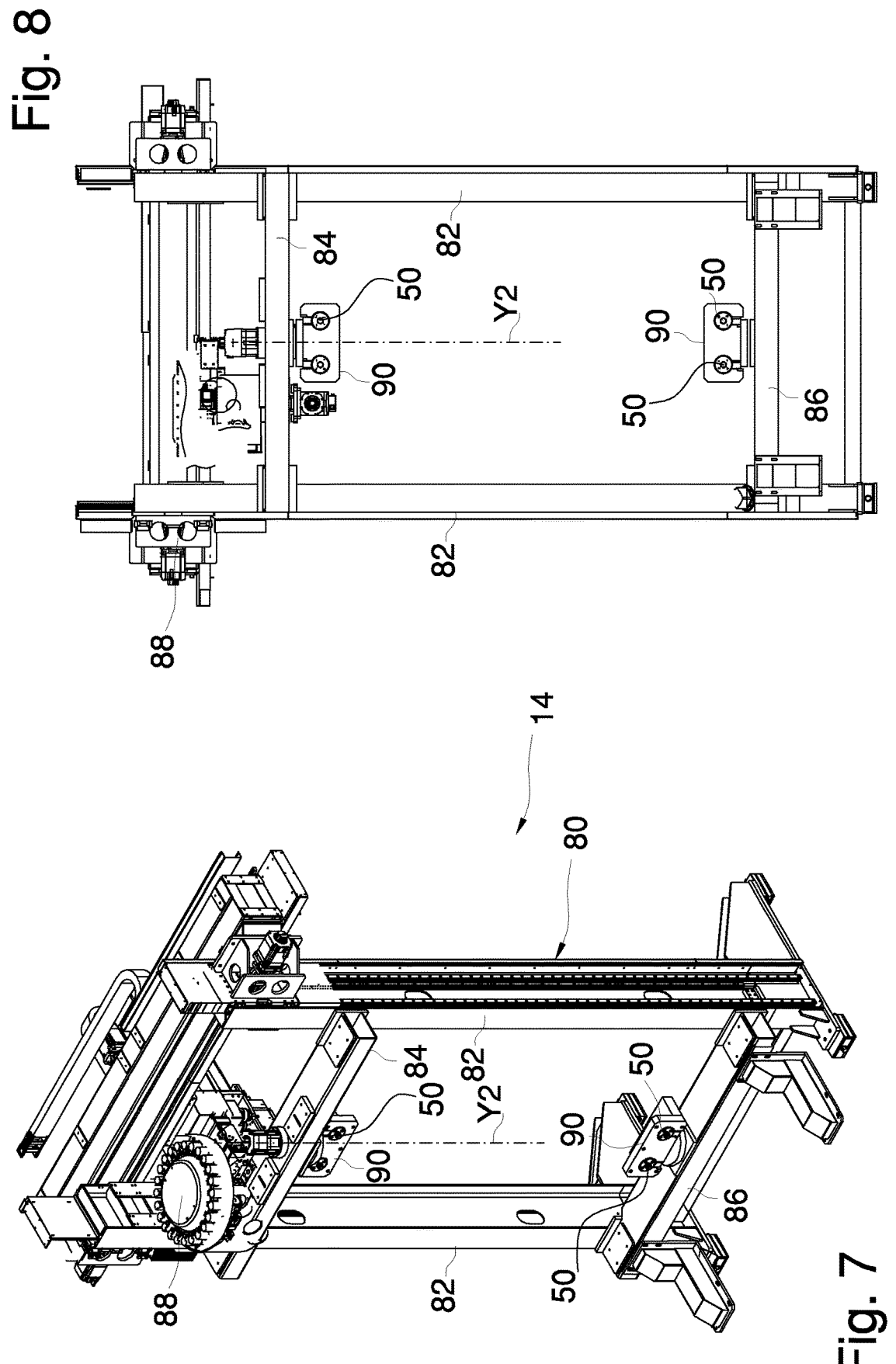
FIG. 7 shows a three-dimensional view of a machining station of the machine.
FIG. 8 shows a front view of the machining station.

A preferred structure for a station 14 is illustrated in FIGS. 7 and 8.

The station comprises a frame or chassis 80 composed of two vertical uprights 82 joined by a lower crossbar 86 and an upper crossbar 84. The vertical uprights 82 with the lower crossbar 86 and upper crossbar 84 form a rectangular or square frame.

On the frame or chassis 80 a known machining turret 86 is movably mounted and equipped with a tool to machine the piece 42.

In particular, on the lower cross member 86 and the upper cross member 84 is mounted an abutment element 90 which houses the part 60 of the anchoring means.

Preferably, the abutment elements 90 are rotatable about the axis Y2, parallel to the axis Y1, in order to be able to rotate the support 30 about the axis when it arrives to the station 14. The rotation about the axis Y2 (via a known drive, e.g. an electric motor), has the advantage that the piece 42 can also show to the tools of the station 14 the side previously facing the table 10.

Figures 3, 4:
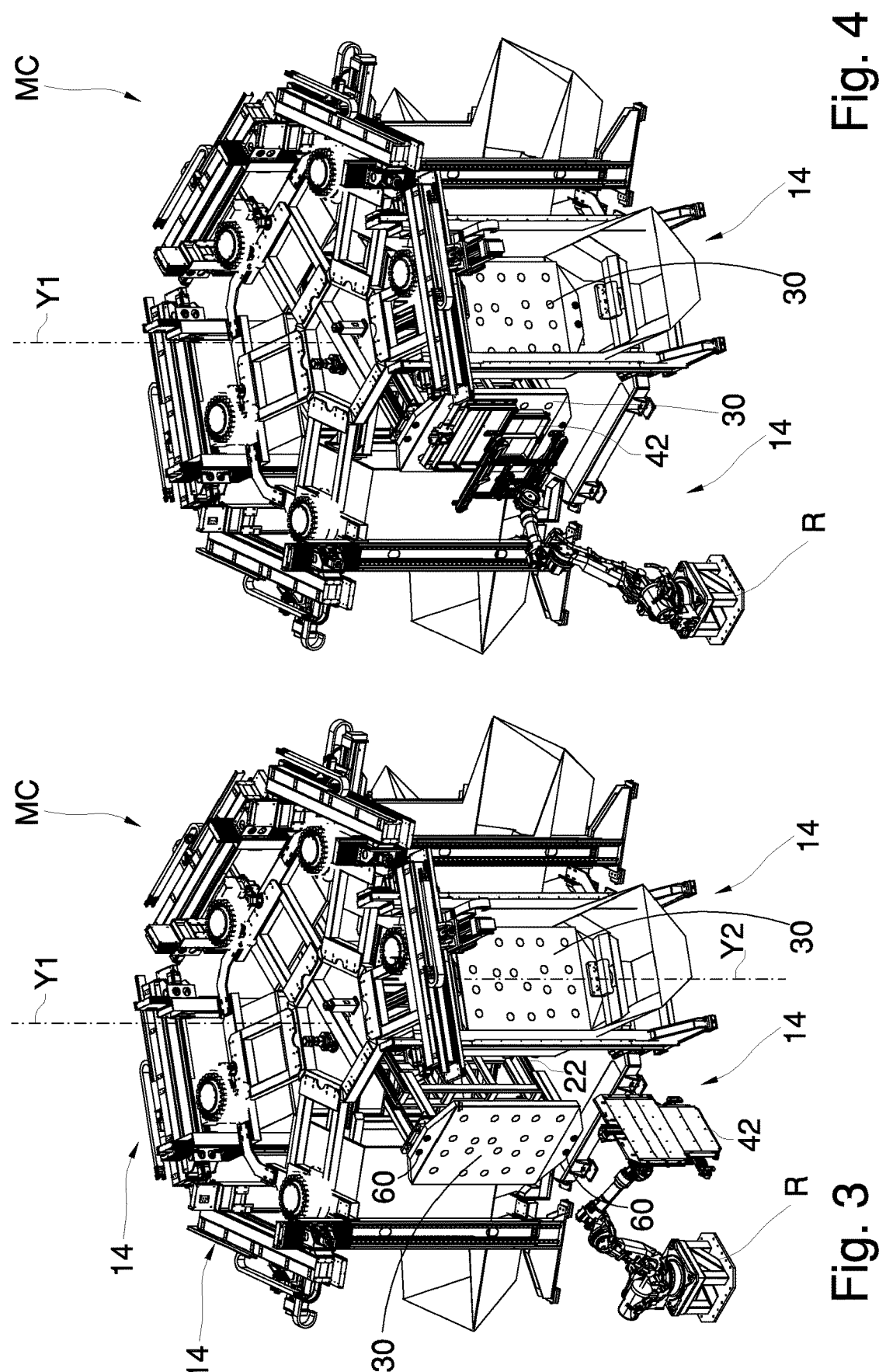
FIGS. 3-6 show three-dimensional views of the machine in different operating configurations.
Figures 5, 6:
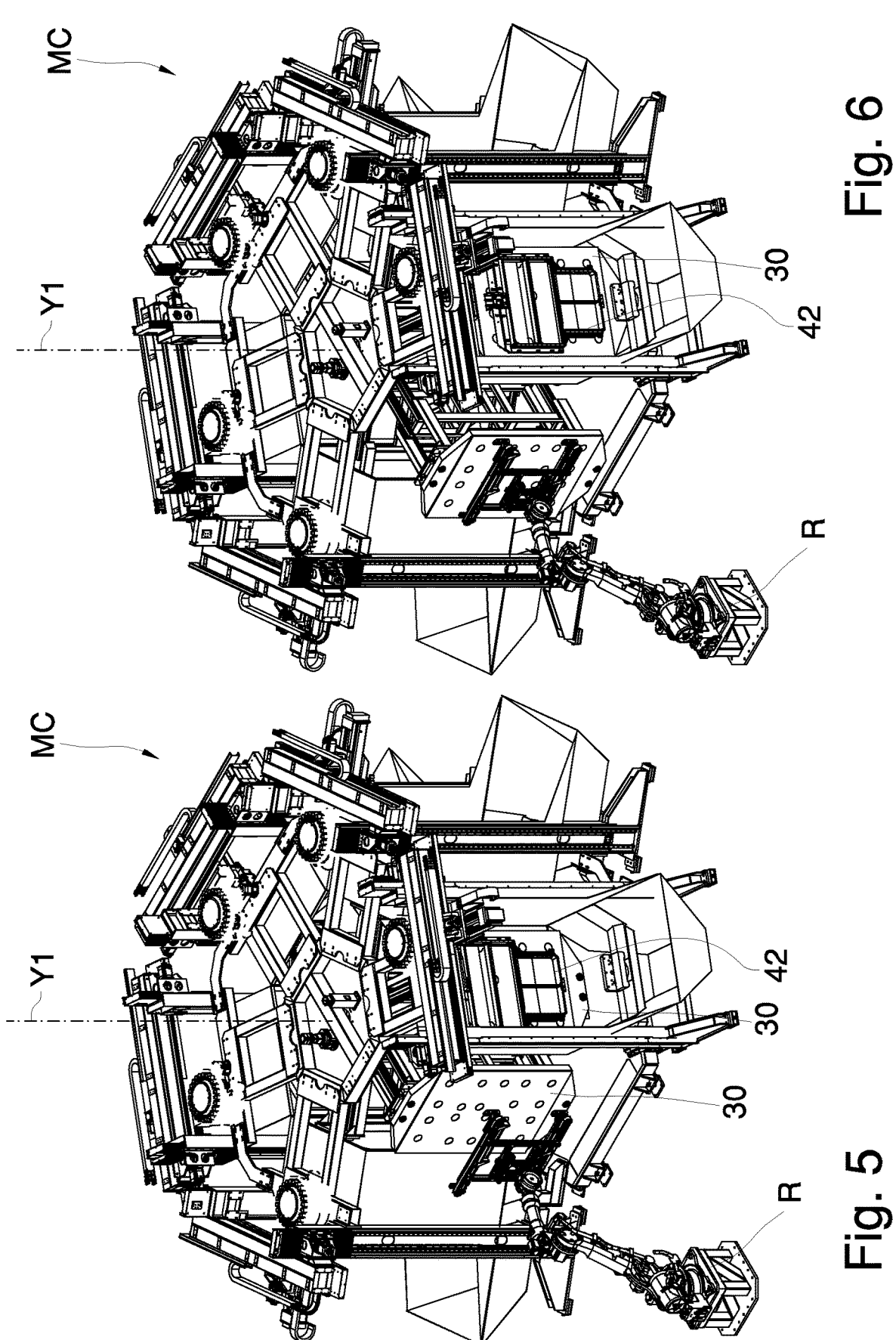

An operating method for machining a piece 42 with the machine MC (see also sequence of FIG. 1) comprises the steps of mounting the piece 42 on a support 30 onboard the table 10 (FIGS. 1a, 2, 3);

blocking the support 30 on the table 10 by operating the anchoring means present on the support 30 (optional), see FIGS. 1b and 4;

retracting the support 30 towards the axis Y1 along the guide 22; this step is optional but advantageous because it facilitates the loading of the piece 42 on a more protruding support 30 from the table 10, rotating the table 10 (FIGS. 5 and 1c) to bring the support 30 with the piece 42 in front of the tools of a station 14 (FIG. 5); in the example shown the rotation angle is 360 degrees/6 stations=60 degrees;

disconnecting the support 30 from the table 10 by deactivating the anchoring means between the table 10 and the support 30;

translating (FIGS. 6 and 1d) the support 30 along the guide 22 by radially moving it away from the axis Y1 to bring the support 30 closer to the station 14 until the support 30 is brought into contact with the frame 80;

connecting the support 30 to the frame 80 by activating the anchoring means between the support 30 and the element 90;

machining the piece 42 with the tool of station 14;

rotating the support 30 about the axis Y2 and machining the piece 42 with the tool of the station 14 (optional);

disconnecting the support 30 from the frame 80 by deactivating the anchoring means between the support 30 and the abutment element 90;

translating the support 30 along the guide 22 nearing it radially to axis Y1 to transfer the support 30 to the table 10 (FIG. 1e);

connecting the support 30 to the table 10 by activating the anchoring means between the table 10 and the support 30;

rotating (FIG. 1f) the table 10 to bring the support 30 with the piece 42 in front of the tools of the next station 14 or unloading the piece 42 from the table 10 if it has already visited all the stations 14 having made a complete turn with the table 10.

Particular efficiency was experienced when the piece 42 is a component for an automobile, e.g. a platform to house electric car batteries; and/or the piece 42 is made of aluminum.

Figure 9:
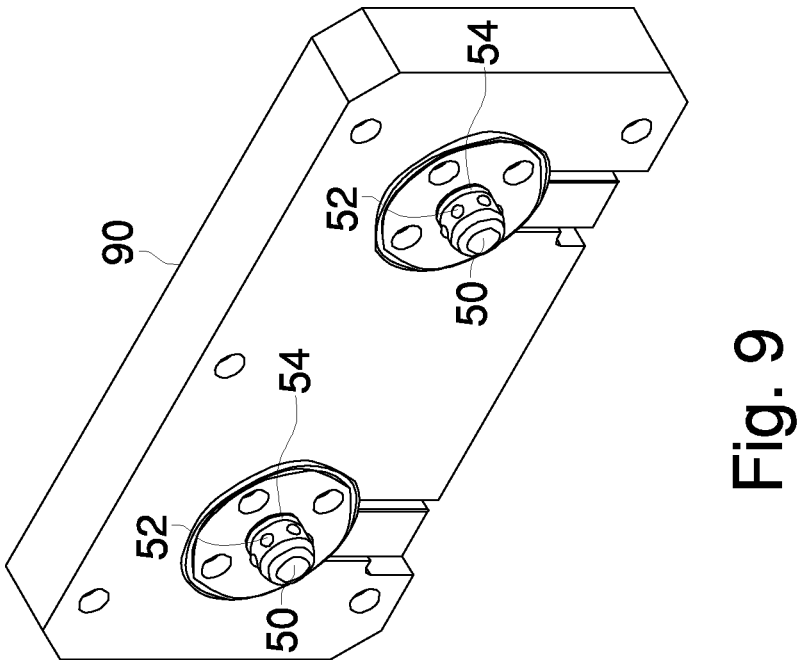

A further embodiment MC2 of the machine is shown in FIG. 9 and the following. Compared to the machine MC of FIG. 2 for simplicity only the central rotating part is shown formed by a central table 110 rotatable about an axis Y1, in use vertical. The table 110 is still surrounded by a plurality of machining stations (not shown) as in FIG. 2.

Figures 11, 12, 13:
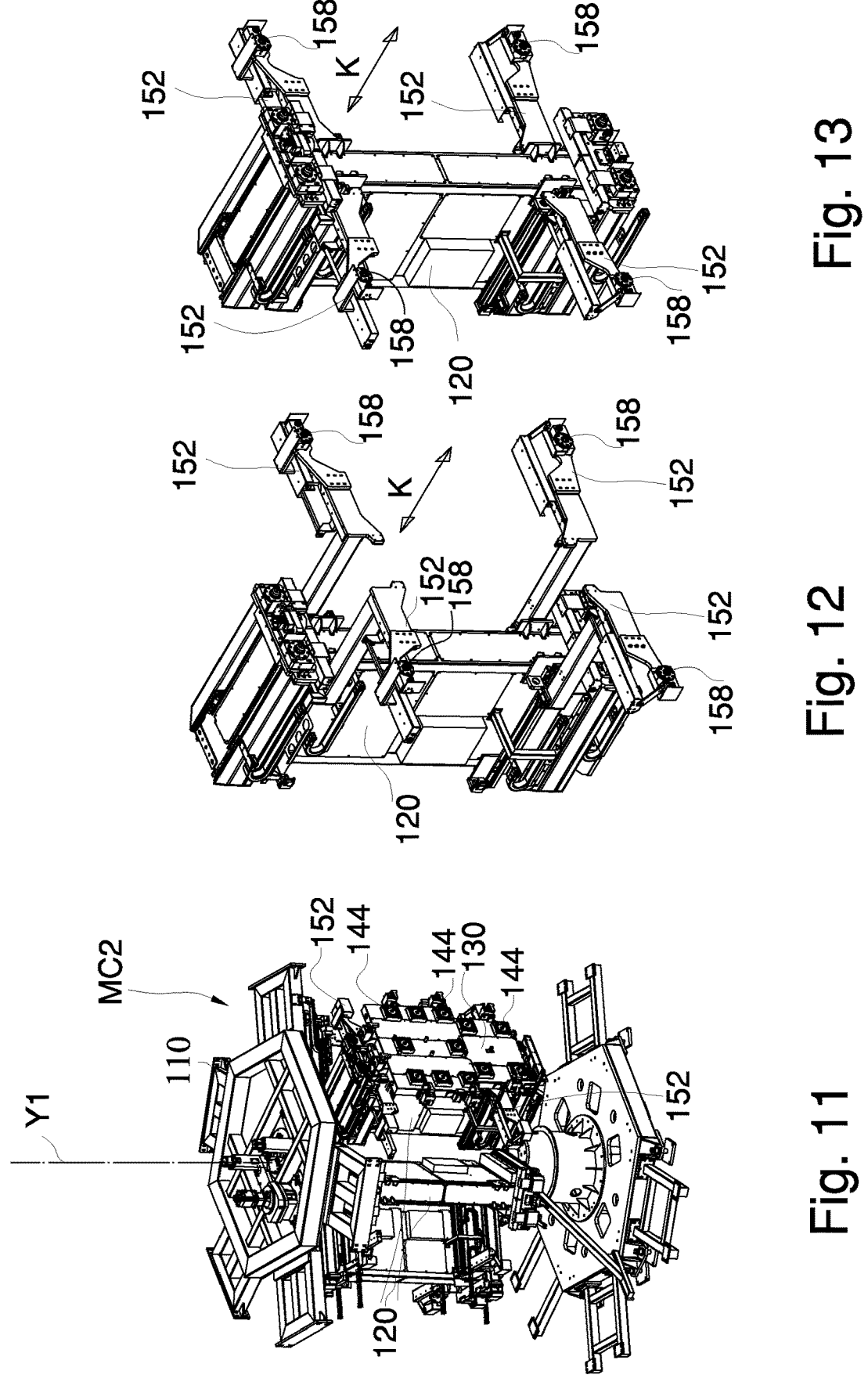
FIG. 11 shows a partial three-dimensional view of a second machine.
FIGS. 12-14 show a partial three-dimensional view of a detail of the machine in FIG. 9.
Figure 14:
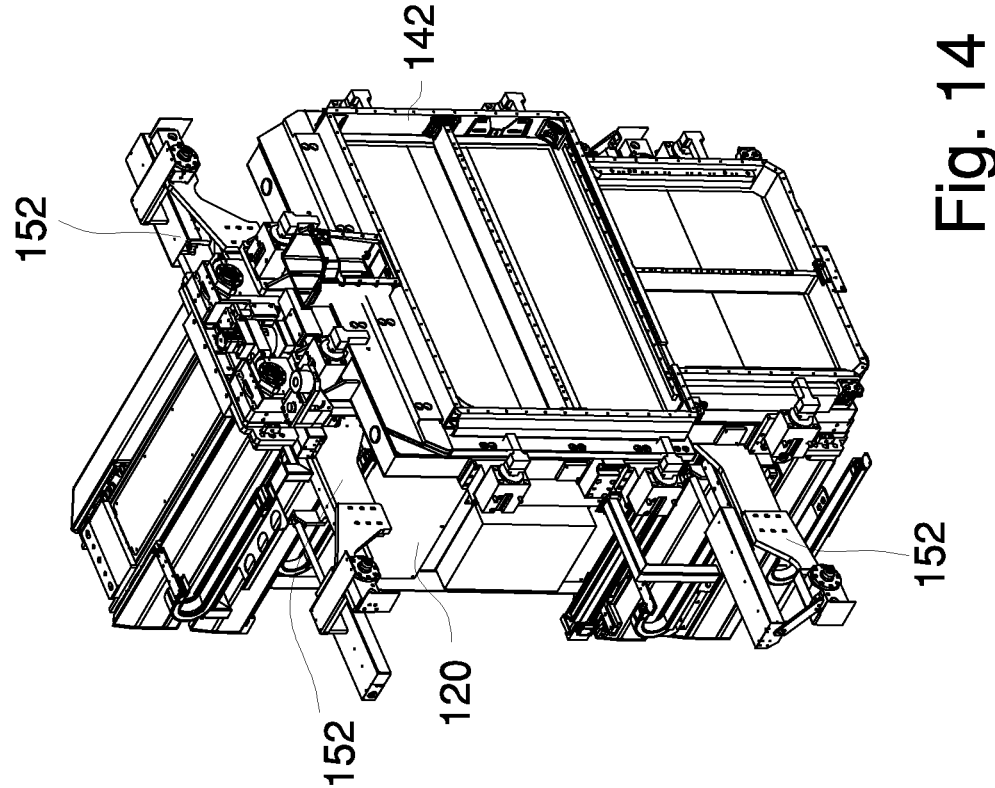
Figure 15:
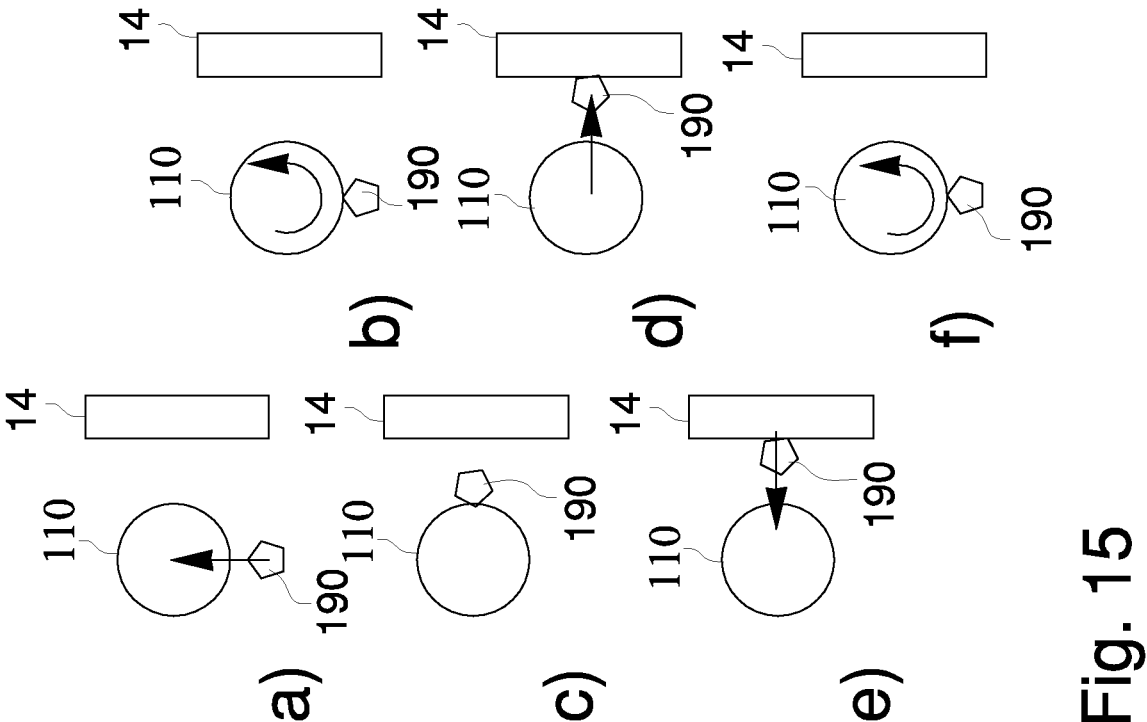
FIG. 15 shows a schematic machining sequence of the second machine.

In the table 110 radial columns 120 extend radially towards each machining station, each column 120 supporting a flat support 130 for a piece 142 (FIG. 12). The piece 142 can be mounted on the support 130, which for this purpose comprises quick-release fittings or blocking elements 144, e.g. pneumatic clamps or magnets, configured to hold the piece 142. The quick clamps 144 may be e.g. like those in FIGS. 8 and 9.

A or each support 130 is transferred from the table 110 to a machining station as previously described for the machine MC, and the operation of the machine 100 replicates the method illustrated in FIG. 1.

A particularity of the machine MC2 is that the table 110 is exploited also for the transportation of tools 190 to one or more machining stations 14, see scheme of FIG. 13.

Basically the sequence of FIG. 1 is replicated wherein now the moved object is a tool 190. Thus the table 110 allows transferring the tools 190 necessary from time to time to the tool machines present in the machining stations. The tables 110, 10 can transport and transfer only the tools 190, only the supports 30 or both simultaneously.

The loading of the tools 190 onto the table 110 may occur, for example, only at a point outside the table 110.

Preferably, instead of a single tool 190 on the table 110, a plurality of tools 190 is loaded at a time, which e.g. is contained by/in a container or a rack.

Figure 10:
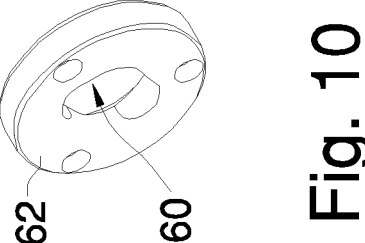
FIGS. 9 and 10 show anchoring means.

In a preferred embodiment, see FIGS. 10 and 11, on a column 120 is mounted slidingly a support element for tools. The support element for tools can be moved relative to table 110 to move away radially from the axis Y1 in order to deliver a tool 190 to a machining center located in a station 14.

In the illustrated example, the support element comprises (FIG. 11) two pairs of L-shaped arms 152 that can slide on the sides of the columns 120 back and forth radially (i.e. orthogonally) with respect to the axis Y1, see arrow K. Each arm 152 can slide along a parallel and offset axis with respect to the axis of another arm 152. Each pair of arms 152 lies on a same plane, horizontal in use, and the planes of the two couples are offset vertically. The arms 152 of each pair are arranged so that two segments of the L extend in opposite directions with respect to the column 120.

At the ends of each arm 152 there is a quick-release connection 158, e.g. as a quick-release connection described above for the machine MC, in particular means that can be activated/deactivated according to the state of a control input. The advantage is to quickly couple the tool 190 to the arm 152.

Preferably, a support or tray to hold and transport at the same time a plurality of tools 190 is coupled to a quick connection 158 on the arm 152.

During operation, the tools are loaded onto a column 120 (FIG. 11), the table 110 rotates to the predetermined station 14, and then the arms 152 slide going away from the column 120 towards the outside of the machine MC2 (FIG. 10) to bring the tools 190 to the receiving station 14. E.g. in the receiving station 14 there are other quick-release connections to which the tools 190 or their container are coupled. Arrived at the receiving station 14, the tools 190 are taken when necessary by spindles or robots for machining the piece 142. In the same way the tools 190 are put from a station 14 back on the arms 152 and returned to the tool magazine.

The invention claimed is:

1. An operation method for a numerical control tooling machine comprising a piece-carrying table, for carrying a piece, rotatable about a first vertical axis and further comprising N machining stations, N≥2, arranged around the table and configured such that the piece be moved from a loading position sequentially to each of the N machining stations and machined at each of the N machining stations, the operation method comprising the steps of:

(a) mounting the piece on the table by applying the piece to a piece support, (b) rotating the table to bring the piece support in front of one station of said N machining stations, (c) disconnecting the piece support from the table, (d) transferring the piece support from the table to the one station by translating the piece support radially from the table to the one station using a linear movement, (e) making the piece support integral with said one station by fixing the piece support to said one station, (f) processing the piece at said one station, (g) rotating the piece support and the piece together about a second vertical axis when the piece support is integral with said one station such that a side of the piece previously facing the table is brought to face the one station for further processing of the piece (h) disconnecting the piece support from said one station, (i) transferring the piece support from said one station to the table by translating the piece support radially from the one station to the table using another linear movement, (j) making the piece support integral with the table by fixing the piece support to the table, (k) rotating the table to sequentially bring the piece support in front of each remaining station of the N machining stations and performing steps (c) to (i) at each said remaining station of the N machining stations, and (l) unloading the piece support from the table after a complete rotation of the table about the first vertical axis, wherein the piece support maintains a constant vertical orientation during the complete rotation of the table.

2. The method according to claim 1, wherein the piece is worked by rotating the piece support about said second vertical axis and inserting a tool in a pass-through opening of the piece support to reach one side of the piece that is in contact with the piece support.

3. The method according to claim 1, further comprising: moving the piece support from the table to said one station of said N machining stations by anchoring the piece support to a frame or chassis of said one station.

4. The method according to claim 3, wherein the piece support is translated along a guide by radially moving the piece support away from the first vertical axis to bring the piece support closer to the one station until the piece support is brought into contact with the frame or chassis of said one station.

5. The method according to claim 1, further comprising the steps of:

turning the table to bring a tool in front of said one station of said N machining stations, disconnecting the tool from the table, transferring the tool from the table to said one station, using the tool to machine at said one station, disconnecting the tool from said one station, transferring the tool from said one station to the table, fixing the tool to the table, and rotating the table to bring the tool to a tool storage.

6. The method according to claim 5, with additional simultaneous steps of transporting and transferring a plurality of tools on the table by means of a tool-holder container.

7. The method according to claim 1, wherein the piece support is fixed on the table by operating anchoring means provided on the piece support.

8. The method according to claim 1, wherein the piece support is disconnected from the table by deactivating anchoring means arranged between the table and the piece support.

9. The method according to claim 1, wherein the piece support is fixed on the table by activating anchoring means arranged between the table and the piece support.

10. The method according to claim 1, wherein the piece is a platform to house electric car batteries.

11. The method according to claim 1, wherein the piece is made of aluminum.

* * * * *